US011167625B2

(12) United States Patent
Kim (10) Patent No.: US 11,167,625 B2
(45) Date of Patent: Nov. 9, 2021

(54) OPEN ROOF CONSTRUCTION FOR USE IN A VEHICLE

(71) Applicant: Inalfa Roof Systems Group B.V., Oostrum (NL)

(72) Inventor: Jangyoung Kim, Shanghai (CN)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 16/723,296

(22) Filed: Dec. 20, 2019

(65) Prior Publication Data

US 2020/0198449 A1 Jun. 25, 2020

(30) Foreign Application Priority Data

Dec. 24, 2018 (CN) .......................... 201811584802.6

(51) Int. Cl.
*B60J 7/057* (2006.01)
*B60J 7/02* (2006.01)
*B60J 7/043* (2006.01)

(52) U.S. Cl.
CPC ............. *B60J 7/057* (2013.01); *B60J 7/0435* (2013.01); *B60J 7/0573* (2013.01)

(58) Field of Classification Search
CPC ... B60J 7/057; B60J 7/0573; B60J 7/02; B60J 7/043
USPC ........................................... 296/216.08, 223
See application file for complete search history.

(56) References Cited

FOREIGN PATENT DOCUMENTS

| DE | 3534375 A1 | 4/1986 |
| DE | 4336222 C1 | 11/1994 |
| DE | 10336618 A1 | 5/2005 |
| DE | 102004049462 A1 | 4/2006 |
| DE | 102009043248 B3 | 6/2011 |
| WO | 2018114343 A1 | 6/2018 |

OTHER PUBLICATIONS

European Search Report and Written Opinion for European Patent Application No. 19218645.0, dated May 8, 2020.

*Primary Examiner* — Dennis H Pedder
(74) *Attorney, Agent, or Firm* — Steven M. Koehler; Westman, Champlin & Koehler, P.A.

(57) ABSTRACT

An open roof construction for use in a vehicle includes, at least one movable element, movable along a stationary guide extending underneath opposite lateral edges of a roof opening. A drive motor drives the movable element, where a drive cable at least partly guided in the stationary guide connects between the drive motor and the movable element. The drive cable is guided in a channel in the stationary guide. The drive cable includes, connected at one end, a drive cable plate. The cable plate connects with the movable element, the cable plate being slidably engaged with at least one wall of the stationary guide, wherein the cable plate further includes at least one separate slide shoe slidably engaging the at least one wall of the stationary guide. The slide shoe is capable of biasing the drive cable plate with respect to the at least one wall of the stationary guide.

20 Claims, 6 Drawing Sheets

OPEN ROOF CONSTRUCTION FOR USE IN A VEHICLE

BACKGROUND

The discussion below is merely provided for general background information and is not intended to be used as an aid in determining the scope of the claimed subject matter.

The invention relates to an open roof construction for use in a vehicle comprising a roof opening in a fixed roof of the vehicle, at least one movable element movable along a stationary guide extending underneath opposite lateral edges the roof opening in a longitudinal direction, said stationary guide guiding the movable element. A drive motor drives the movable element. A drive cable member at least partly guided in the stationary guide is connected between the drive motor and the at least one movable element. The drive cable member is guided in a channel in the stationary guide, and capable of pushing or pulling the at least one movable element in the stationary guide in a longitudinal direction. The drive cable member further includes connected at one end, a drive cable plate, said drive cable plate being connected with the at least one movable element, the drive cable plate being slidably engaged with at least one wall of the stationary guide.

Such open roof constructions are known in the art. Such constructions having a drive cable plate may suffer from rattling when used in a vehicle under dynamic circumstances. Such rattling may occur between the drive cable plate and the wall surfaces of the guide. Usually, during development of the open roof construction, when rattling noise is detected after dynamic tests, the drive cable plate is improved by adding a small increase in thickness of the drive cable plate such that the rattling no longer occurs or is reduced. For this it is necessary that the injection molding tool of the plastic part of the drive cable plate is modified. This is quite time- and cost consuming, taking in account that this process of increasing the thickness of the drive cable plate is usually done in more than one step at a time. Once the drive cable thickness is increased to a level that no more rattling occurs during dynamic tests, there may be problems of heavy running or a phenomenon called "groaning" noise caused by the drive cable plate sliding along the surfaces of the walls of the guide. The heavy running may cause a higher level of noise generated by the electric drive motor or it is even possible that the temperature of the motor will exceed a certain level causing the thermal fuse to stop the motor from operation. The so-called "groaning" noise is a noise that is caused by a phenomenon called slip-stick operation. This slip-stick operation is caused by the varying level of friction between the drive cable plate and the guide wall along which the drive cable plate is sliding. This varying friction is caused by the phenomenon that the static friction coefficient between two surfaces is larger than the kinetic friction coefficient. If an applied force is large enough to overcome the static friction, then the reduction of the friction to the dynamic friction can cause sudden significant changes in the velocity of the movement, whereby the drive cable plate in a continuous way repeats a sequence of a sliding motion, a stop, a sliding motion, a stop etc. occurring in very short intervals thus causing the groaning noise. The groaning noise can be avoided by adding a lubricant between the sliding surfaces, however this may cause extra costs and visible surfaces of for instance of the movable screen or the movable panel may be polluted by the lubricant.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

One aspect of improving the open roof construction is a drive cable plate that further includes at least one separate slide shoe device slidably engaging the at least one wall of the stationary guide and said slide shoe device being capable of biasing the drive cable plate with respect to the at least one wall of the stationary guide.

In this way the drive cable plate is biased between walls in the guide. The biasing force is chosen such that on the one hand it is avoided that the drive cable plate starts to rattle under dynamic circumstances and on the other hand that the friction is not too high causing a groaning noise between the slide shoe device and one of the walls of the guide. An open roof construction as described before may be fitted in an opening of the roof of a vehicle.

In one embodiment, the movable element is either of a movable panel or a movable screen and wherein the drive cable plate is directly or indirectly connected to either of the movable panel and the movable screen. The slide shoe device may be fitted to the drive cable plate of the movable panel and/or to the drive cable plate of the movable screen. Also it is conceivable that the slide shoe device is fitted to a drive cable plate that drives both the movable panel and the movable screen simultaneously.

In one aspect of the invention, the drive cable plate includes a main body and wherein the slide shoe device is movably engaged with the main body. Further the slide shoe device is formed as a receptacle made of polyoxymethylene (POM) or an equivalent material of the same class of materials, and is movably guided in a recess in the main body. The slide shoe device further includes a buffer element having biasing properties fitted into the inner space of the receptacle. The buffer element is biased between an inner bottom surface of the receptacle and a protrusion part of the main body so as to prevent any gap between the drive cable plate including the slide shoe device and the at least one wall in the stationary guide. The slide shoe device is slidably engaged in a hole formed in the main body of the drive cable plate and because the inside of the slide shoe device is formed as a receptacle, a buffer element having biasing properties can be fitted inside.

The buffer element is compressed between the inside of the receptacle shape of the slide shoe device and a protrusion part of the main body. The buffer element as such is compressed and therefor provides a biasing force that supports on the protruding part of the main body of the drive cable plate and forces the upper side of the slide shoe device against one of the walls forming a continuous lateral opening, therewith avoiding any gap so no rattling occurs in dynamic conditions. Also the buffer element provides a biasing force that is not too high and avoids the friction that causes a groaning noise. Too make sure that the biasing force of the buffer element is not too high or too low it becomes now much easier to tune this biasing forces for a particular type of open roof construction and for the use of the buffer element for a front beam of a movable screen or a mechanism that drives the movable panel just by adapting the size of the buffer element to the required biasing force.

According to another aspect of the invention, ethylene propylene diene monomer (EPDM) buffer material is over-molded into the receptacle shaped slide shoe device. This can be done in a so called 2K molding process, whereby in a 2K molding tool in a first step of the process the receptacle is made in a first material, for instance POM or an equivalent material from the same class of materials and subsequently in a second step of the process the slide shoe device is molded into the receptacle in a second material, for instance EPDM or an equivalent material of the same class of materials. Such subsequent process steps would be beneficial in relation to the costs of manufacturing the product in high volumes and also it would attach the EPDM buffer to the inside of the receptacle without adding an additional process step of gluing.

In another aspect of the invention, the buffer element is made of an EPDM rubber or an equivalent material of the same class of materials having biasing properties, and has a shore hardness in the range of about Shore A 40 to about Shore A 80, more specifically the EPDM rubber has a shore hardness of about Shore A 60. It is important in the design that the biasing force which is needed to have a rattle free design and also a design which is free from groaning noises (noises of a slip-stick phenomena) can be tuned to the actual tolerances of the guide and the drive cable plate. An EPDM rubber is a suitable material in the performance as a buffer material, not only for its resilience required in practicing a biasing force but also because of its dampening capabilities. For this it can be helpful to tune the biasing force with help of the hardness of the buffer element, whereby a higher biasing force may be produced with a harder material value and or with a bigger height H of the buffer element measured between the upper side of the receptacle and the protrusion part on the drive cable plate. The opposite may be reached with a softer material hardness and/or a smaller Height H of the buffer element.

In another aspect of the invention, the slide shoe device is movably connected to an upper surface of the drive cable plate and is engaging the at least one wall of the stationary guide. The receptacle part of the slide shoe device is slidable guided in an opening in the upper surface of the drive cable plate, the opening having the same outline shape as the receptacle, as such the receptacle is able to slide in a substantial vertical direction up or downward without moving in a lateral or longitudinal direction. So the biasing force is produced by the buffer element inside the receptacle whereby the slide shoe device is being clamped between a wall formed at the stationary guide and the protrusion part in the drive cable plate. And the biasing force can be adapted over time due to the capability of the receptacle to slide in an up- or down ward direction.

In yet another embodiment, the slide shoe device is movably connected to a lower surface of the drive cable plate engaging the at least one wall of the stationary guide. This can be a solution, in case for example, for packaging reasons or for reasons of manufacturability of the guide section, the slide shoe device has to be placed up-side down. The drive cable plate may have the recess for the slide shoe device only on the lower side of the drive cable plate. Or whenever the width of the upper surface of the walls is not big enough to provide a sliding surface for the slide shoe device, it may be beneficial to have the slide shoe device engaging the lower sliding surface of a wall of the stationary guide.

In yet another embodiment, the slide shoe device is provided with a ribbed surface engaging at least one of the walls of the stationary guide. The ribbed surface includes ribs for removing dust, having an angle with respect to the direction of the longitudinal guide in the range of about 30 to about 60 degrees. Preferably the ribbed surface comprises ribs having an angle with respect to the direction of the longitudinal guide of about 45 degrees. It is beneficial to remove dust, dirt and other small debris, collected during use of the open roof construction in the vehicle, from the sliding surfaces of the at least one wall of the stationary guide. This is beneficial because of the fact that dust, dirt and small debris may negatively influence the operation of sliding of the drive cable plate in the stationary guide. It may cause heavy sliding noises, squeak noises and in particular may cause: "groaning noises", as it influences the dynamic friction between the sliding surfaces. As such the ribbed surface may improve this situation by moving a part of the dust, dirt and small debris in a lateral direction away from the sliding surfaces by the under an angle oriented ribs.

BRIEF DESCRIPTION OF THE DRAWINGS

Further details and advantages of aspects of the invention will become clearer from the following description of embodiments of the roof system with reference to the drawings.

FIGS. 9 and 10 are perspective views of the slide shoe device, whereby FIG. 10 is a cross section along line X-X in FIG. 9.

DETAILED DESCRIPTION OF THE ILLUSTRATIVE EMBODIMENTS

Figure 1:
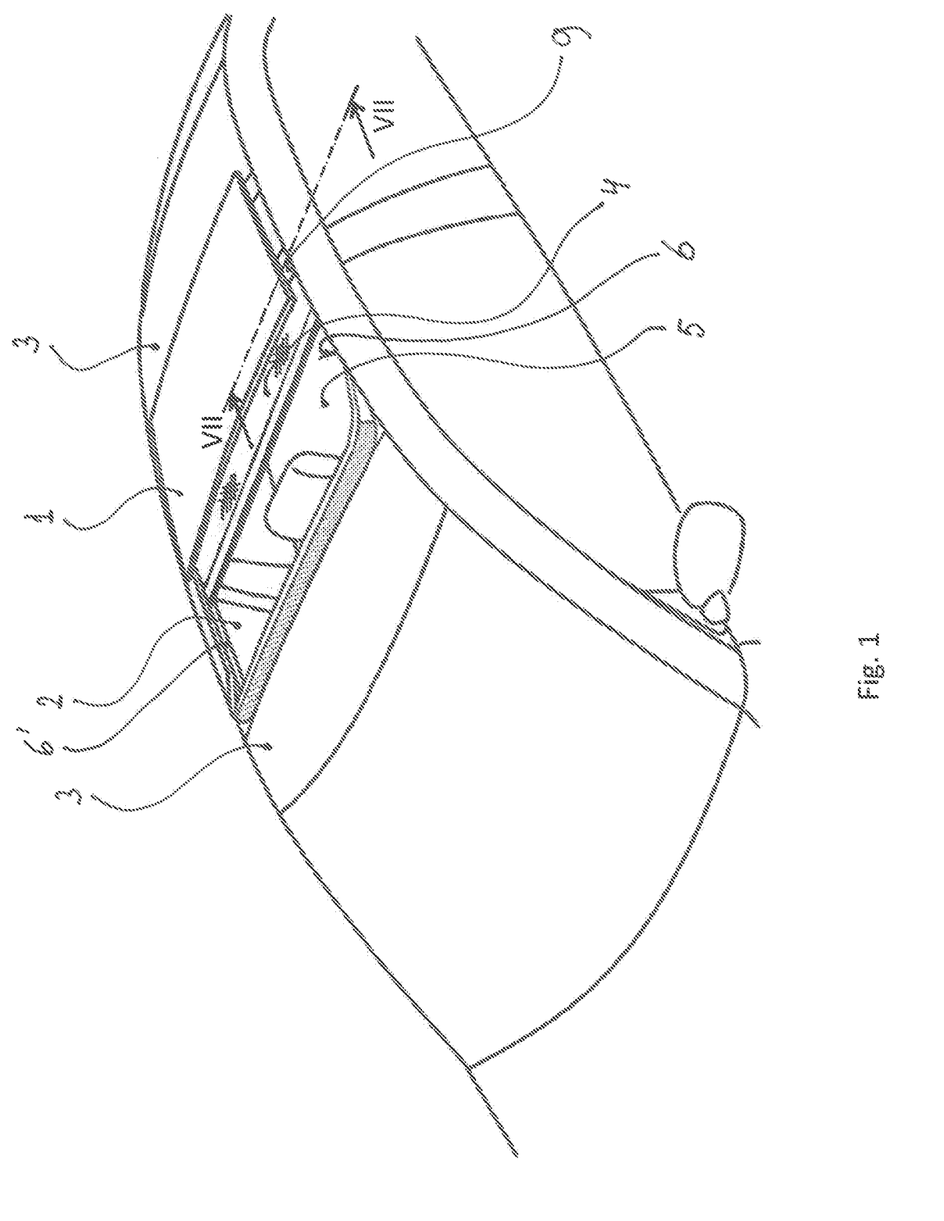
FIG. 1 is a partial perspective view of a vehicle provided with the open roof construction with the movable panel in open position.

As is known per se such a roof system (known also as a spoiler roof or an exterior sliding roof or a down sliding roof) as is illustrated in FIG. 1, could comprise additional elements, such as for instance a tiltable wind deflector positioned ahead of the roof opening 2 formed in fixed roof 3, and further movable or stationary panels, for example positioned behind the panel 1 when it is in closed position. In fact, in the present embodiment, the roof part behind the roof opening 2 is formed by a fixed panel. The front panel in this embodiment is a movable panel 1, which is movable over the fixed panel however in other embodiments such panel may be a stationary panel. Underneath the surface of the movable panel 1 and the fixed panel a movable screen 4 is positioned. The movable screen 4 in this embodiment is a rollo whereby the screen cloth or screen mosquito net is capable of being rolled up onto a winding shaft placed at the rear edge of the roof opening 2 and capable of being extended towards the front edge of the roof opening 2. However it is also conceivable that the movable screen 4 is a solid screen; a so called sunshade, capable of being slidably moved underneath the movable panel 1 and the fixed panel. The movable screen 4 as well as the movable panel 1 are slidably guided in stationary guides 6, 6' positioned below the roof opening 2 along both its lateral edges. The movable panel 1 is driven by a mechanism 9 guided in one of the channels 11, 11' of the stationary guide 6, 6'.

Figure 2:
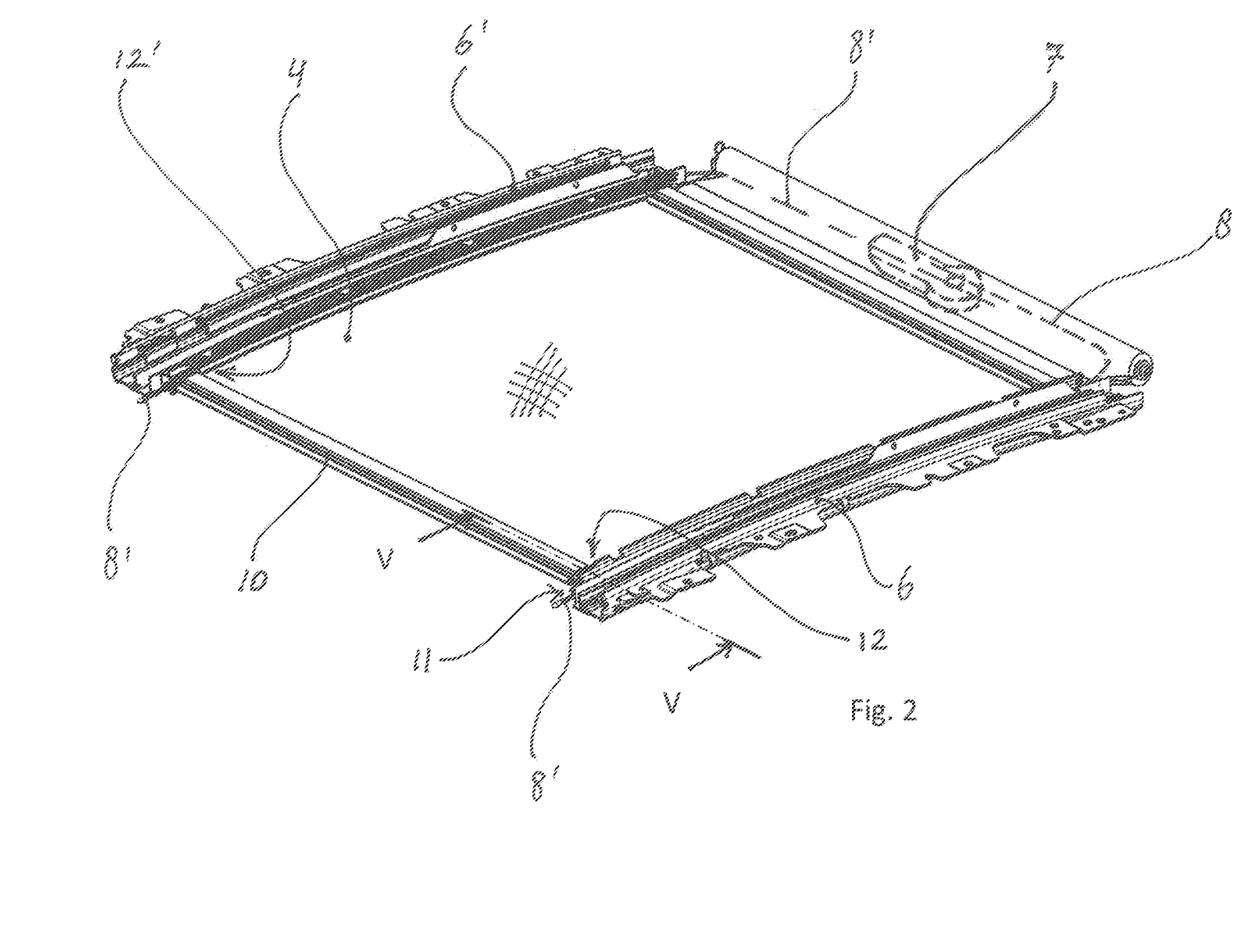
FIG. 2 is a partial perspective view of part of the open roof construction whereby the stationary guides and the movable screen are visible.

In FIG. 2. it is shown that the movable screen 4 is guided in the stationary guides 6, 6'. At one end a rollo shaft is shown onto which the cloth or fabric of the screen can be rolled up such to open the area underneath the movable panel 1. The movable screen 4 comprises a front beam 10 at the end of the cloth or fabric opposite to the rollo shaft. The front beam 10, at both its lateral ends, is movably guided in a channel 11, 11' in the stationary guides 6, 6'. The movable panel 1 (shown in FIG. 1) comprises a mechanism 9 that moves the panel in longitudinal and vertical directions, which mechanism 9 is also slidably guided in a separate channel 11, 11' in the stationary guides 6, 6'. It may be conceivable that the stationary guides 6, 6' of the movable screen 4 and the ones for the movable panel 1 are the same as described for this embodiment, but may also be separate parts that are fixed together, for instance because the stationary guides for the movable screen 4 may be of plastic material whereas the other guides for the movable panel 1 are of aluminium material. Both the mechanism 9 as well as the aforementioned front beam 10 may be driven by a drive cable member 8, 8'. The drive cable member 8, 8' is a flexible cable of metal that is coupled on one end to either of the front beam 10 of the movable screen 4 and the mechanism 9 of the movable panel 1 and to an electric drive motor 7 at its other end. The electric motor 7 may drive the drive cable member 8, 8', said member being slidably engaged in a channel 11, 11' in the stationary guides 6, 6' in a substantial longitudinal direction to operate either of the movable screen 4 and the movable panel 1.

Figure 3:
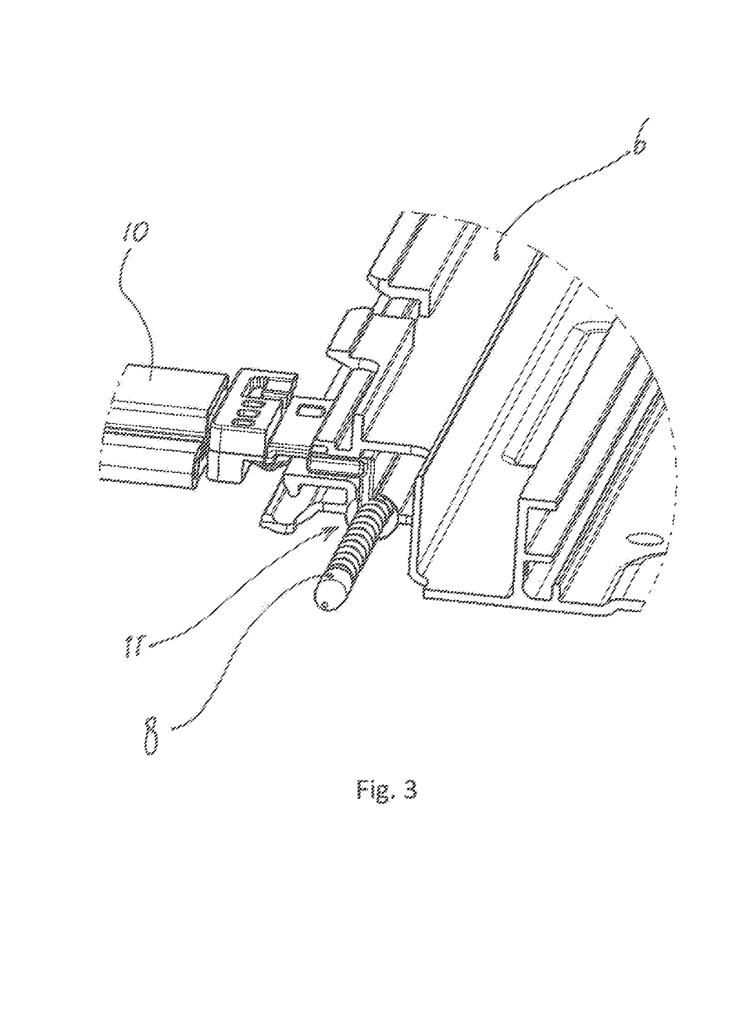
FIG. 3 is a perspective view on one end of the stationary guide and further showing part of the front beam of the movable screen and part of the drive cable plate and drive member in unassembled condition next to each other for more clarity.
Figure 4:
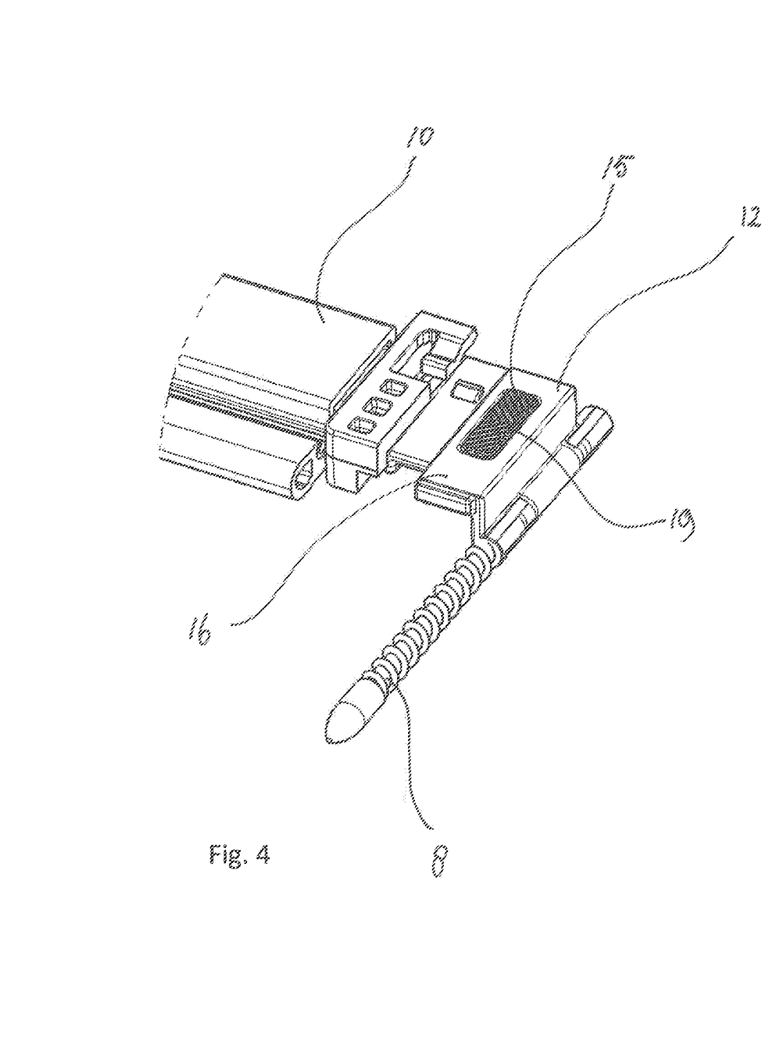
FIG. 4 is a similar view as FIG. 3, however now not showing the stationary guide.

In FIGS. 3 and 4 closer views are shown of the connection of the drive cable member 8, 8' to the front beam 10. In FIG. 3 it is shown that the drive cable member 8, 8' slides in a channel 11, 11' created in the stationary guides 6, 6'. Also the front beam 10 is shown, which is basically a beam extending in a transverse direction with respect to the longitudinal direction of the stationary guides 6, 6' and to which one end of the screen or fabric is mounted. The lateral ends of the front beam 10 are each equipped with an intermediate part to which the drive cable plate 12, 12' is fixed. In this embodiment the connection is made by means of a click fixing however other types of fixings are also conceivable. The drive cable plate 12, 12' as can be seen in FIG. 3 is a part which is attached on an end of the drive cable member 8, 8'. In practice it is often chosen to fix the drive cable plate 12, 12' at a small distance from the extreme end of the drive cable member 8, 8'. This is useful when the drive cable member 8, 8' including the drive cable plate 12, 12' is mounted in the channel 11, 11' of the stationary guides 6, 6' during assembly of the open roof construction. Also in FIG. 4, the drive cable plate 12, 12' is shown comprising the slide shoe device 15. In this embodiment the slide shoe 15 is shown mounted onto the upper side of the drive cable plate 12, 12' and protruding in an upward direction.

Figures 5, 6:
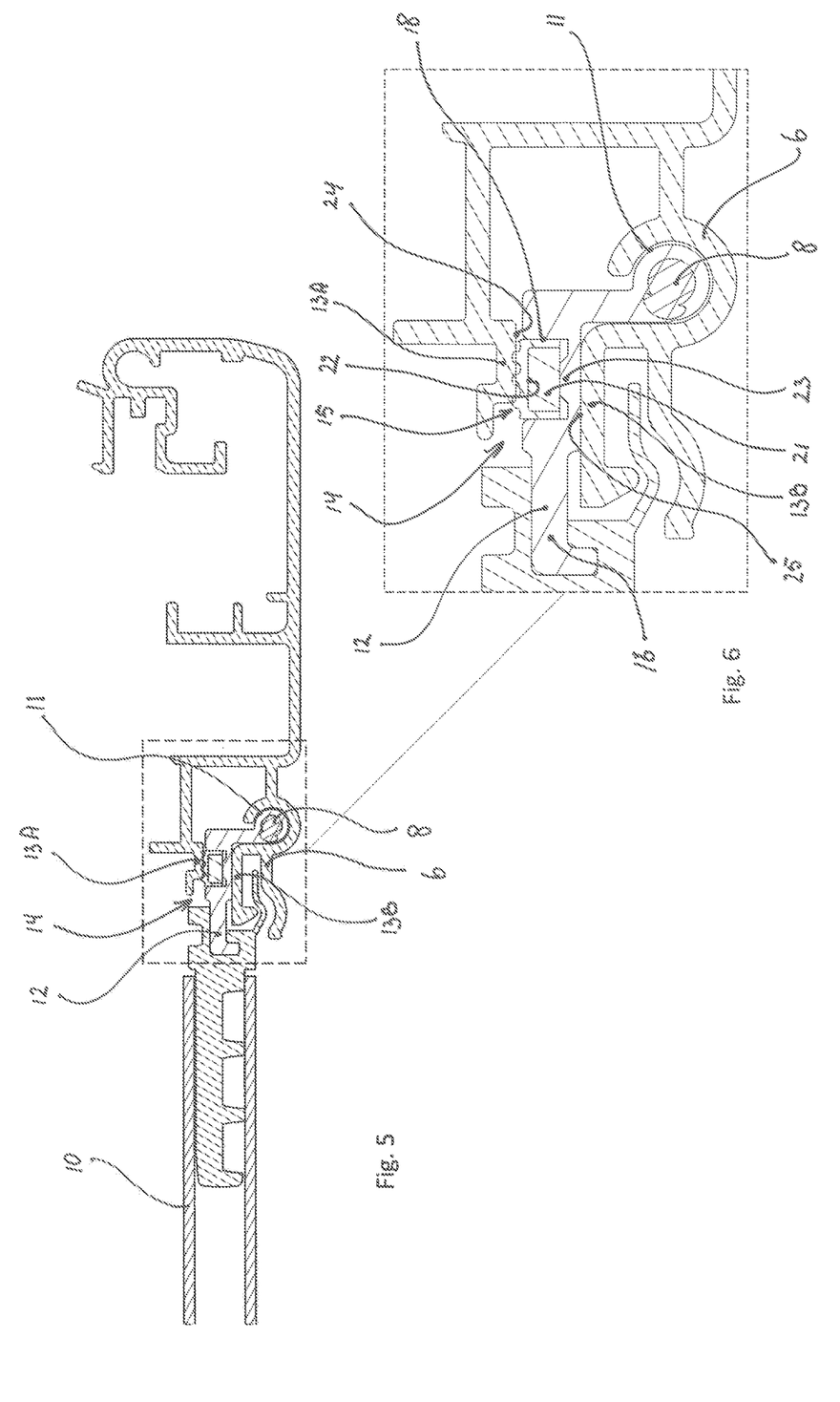
FIG. 5 is a cross section along line V-V in FIG. 2 showing the assembled rollo beam with drive cable plate and drive member in the stationary guide.
FIG. 6 is an enlarged view of the section of FIG. 5 showing the details of the drive cable plate.

FIG. 5 is a sectional view that shows how the drive cable plate 12, 12' is mounted in the stationary guide 6, 6' and how it is connected to the drive cable member 8, 8'. Further the drive cable plate 12, 12' is shown being connected with the intermediate part that is fitted into the front beam 10 of the movable screen 4. The slide shoe device 15 is shown and slidably fits into the drive cable plate 12, 12'.

In FIG. 6 the slide shoe device 15 is shown in a larger view. The slide shoe device 15 is fitted into a recess 18 in the drive cable plate 12, 12' and is clamped between a protrusion part 23 of the drive cable plate 12, 12' and a wall 13A of the guide. The slide shoe device 15 comprises a holder being a receptacle 17 comprising a biasing buffer element 21. Because of the compression of the buffer element 21 between an inner bottom surface 22 of the receptacle 17 and the protrusion part 23 of the main body 16, the buffer element 21 biases the receptacle 17 of the slide shoe device 15 towards the opposite facing wall 13B of the stationary guide 6, 6' and thereby clamps the drive cable plate 12, 12' between two opposite walls 13A, 13B of the stationary guide 6, 6' so as to prevent any gap between the drive cable plate 12, 12' including the slide shoe device 15 and the stationary guide 6, 6'.

Figure 7:
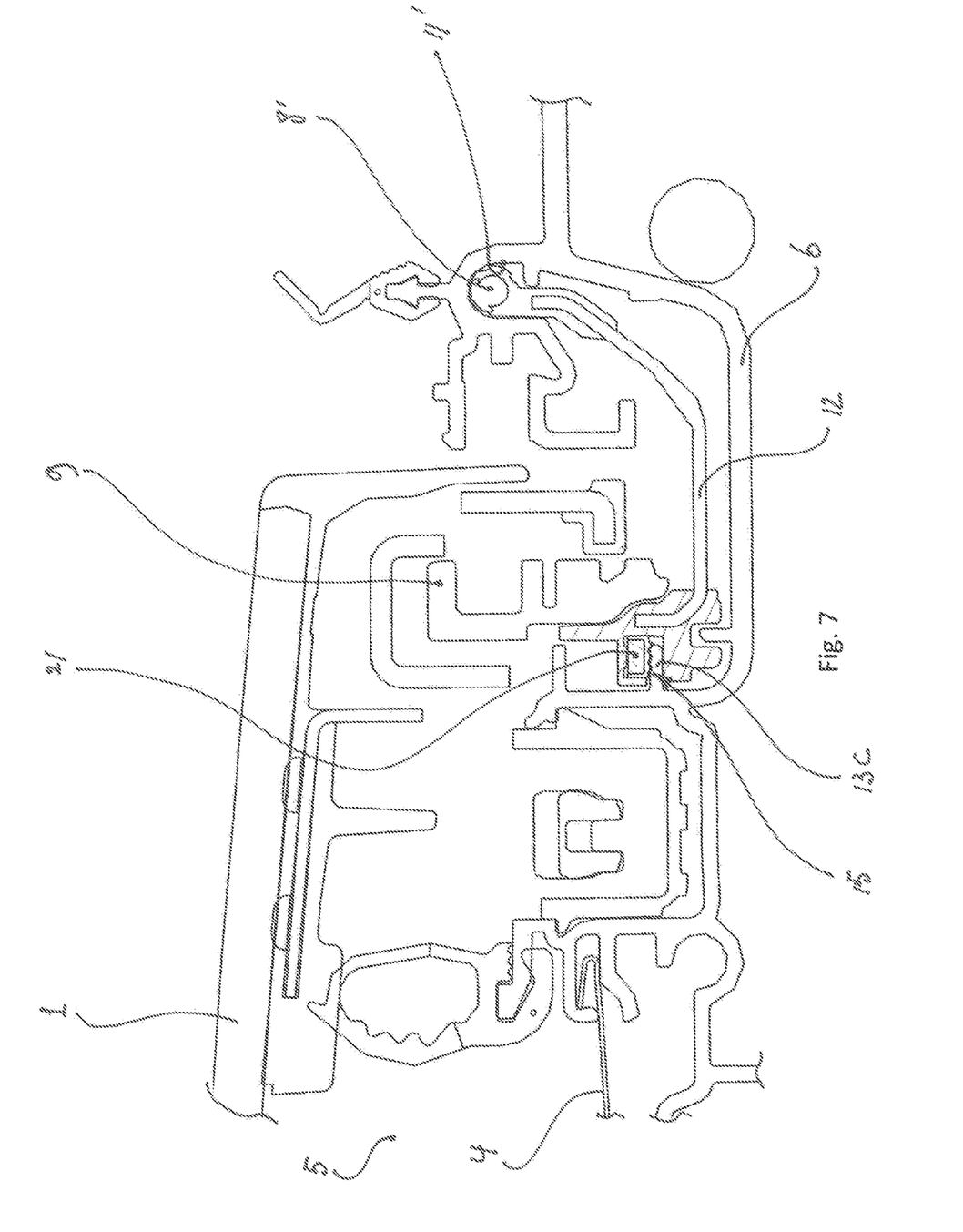
FIG. 7 is a cross section along line VII-VII in FIG. 1, showing the mechanism, the drive cable plate and drive cable member in the stationary guide.
Figure 8:
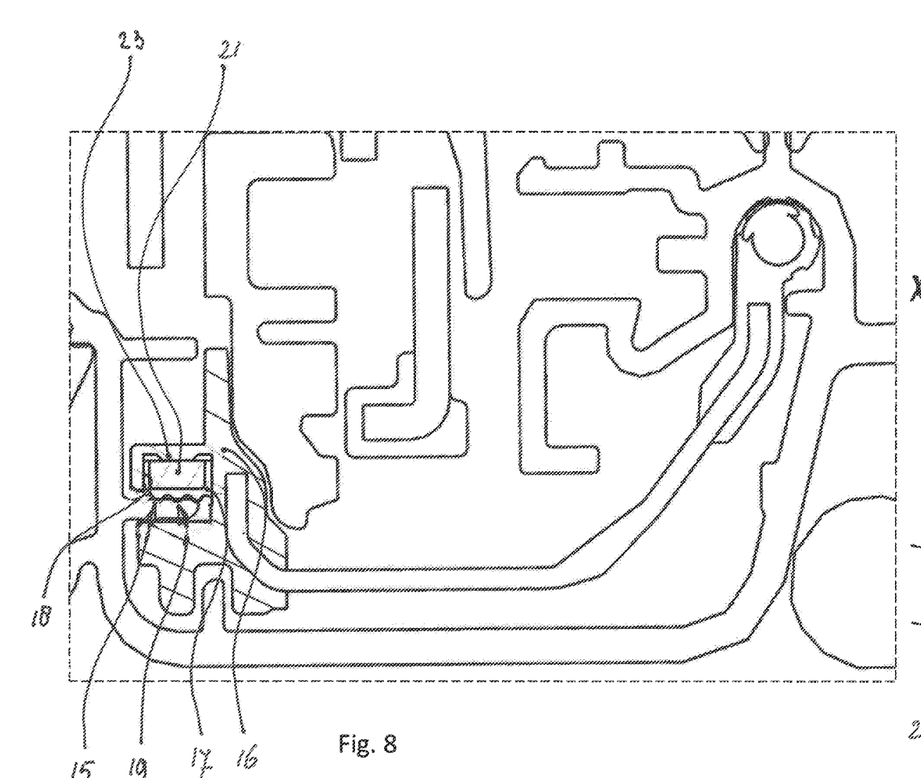
FIG. 8 is an enlarged view of the section of FIG. 7 showing the details of the drive cable plate.

FIGS. 7 and 8 are sectional views that show that the drive cable member 8, 8' is slidably engaged in a channel 11, 11' of the stationary guide 6, 6'. The drive cable plate 12, 12' is connected to the drive cable member 8, 8' and the opposite end of the drive cable plate 12, 12' is connected to the mechanism 9 that drives the movable panel. The drive cable plate 12, 12' in this embodiment bridges the distance between the channel 11, 11' for the drive cable member 8, 8' and the channel 11, 11' in which the mechanism 9 is slidably engaged. In FIG. 7 it can be seen that on the far left part of the drive cable plate 12, 12' a plastic part is formed on a steel carrier of the drive cable plate 12, 12'. In this plastic part the slide shoe device 15 is positioned, which is engaged with a wall 13C in the stationary guide 6, 6'. In this embodiment the wall 13C is clamped between the slide shoe 15 device and the lower area of the plastic part of the drive cable plate 12, 12'. As such the slide shoe 15 is biased and may prevent the occurrence of rattling noises of the drive cable plate 12, 12' to one of the walls 13A, 13B, 13C of the stationary guide 6, 6'. The orientation of the slide shoe device 15 in this embodiment is such that the slide shoe device 15 is placed in a recess at the bottom of the drive cable plate 12, 12' facing a downward direction.

Figures 9, 10:
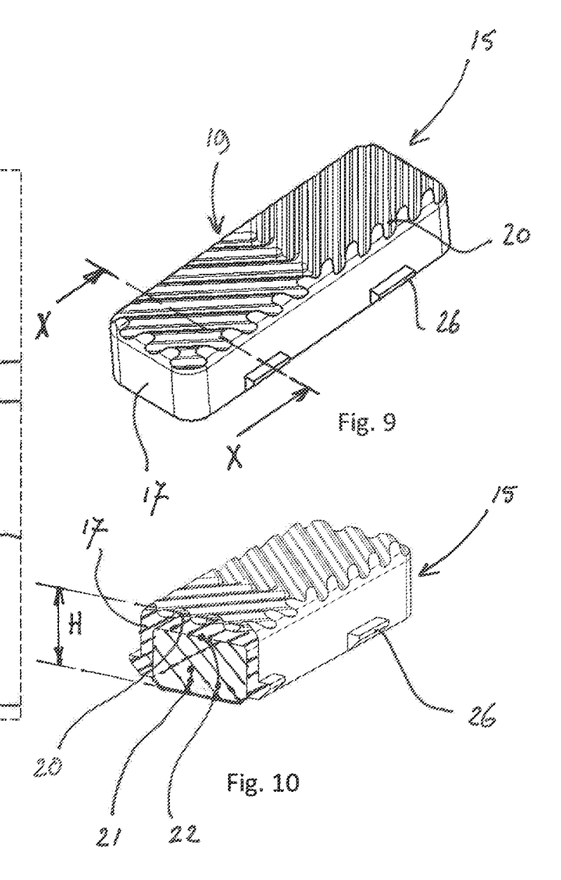

In FIGS. 9 and 10 the slide shoe device 15 is shown. The receptacle 17 of the slide shoe device 15 is equipped with a ribbed surface 19 on the upper outside. This side is in contact with the sliding surface of the wall 13A, 13B, 13C in the stationary guide 6, 6'. The ribbed surface 19 comprises ribs 20 that are formed under an angle with regard to the longitudinal direction of the sliding surfaces of the walls 13A, 13B, 13C in the stationary guide 6, 6'. And also with the longitudinal shape of the receptacle 17 itself. In this embodiment the ribbed surface 19 is split in two parts, whereby one half of the ribbed surface 19 has ribs 20 oriented with an angle in a first direction, and the other half of the ribbed surface 19 is oriented with an angle in a second direction. In this case the angle between the first and second direction is about 90 degrees. It is however conceivable that the angle is larger or smaller than the aforementioned 90 degrees. The purpose of the angled ribs 20 is to make sure that dust, dirt and small debris is removed as much as possible from the sliding surfaces on the walls 13A, 13B,

13C of the stationary guides 6, 6'. Trenches between the ribs 20 provide for space in which the dust, dirt or small debris may be collected and be lead sideways over time towards an area lateral of the sliding surfaces of the walls 13A, 13B, 13C. The receptacle 17 is provided with small retainer hooks 26 that hook behind edges of the recess 18 in the drive cable plate 12, 12'. This is to avoid the slide shoe device 15 from protruding too far out of the upper or lower surface of the drive cable plate 12, 12'. The buffer element 21 inside the receptacle 17 may be made such that the buffer element 21 completely fills the inside of the receptacle 17; however, it is also conceivable that the buffer element 21 protrudes outside the receptacle 17 or that the buffer element 21 does not completely fill the inside of the receptacle 17. Using the height H between the lower side of the buffer element 21 and the upper side of the ribbed surface 19, the biasing force may be set to a certain force required to avoid rattling noises and "groaning" noises. So the buffer element 21 may be tuned by means of height H and the hardness of the material, at the final stage of the development process of the open roof construction to reach a noise free operation of the movable screen 4 and/or movable panel 1 under dynamic vehicle circumstances.

Aspects of the invention are not limited to the examples described above and shown in the drawings and may be varied in different other ways.

What is claimed is:

1. An open roof construction for use in a vehicle comprising,
    a roof opening in a fixed roof of the vehicle,
    at least one movable element, movable along a stationary guide extending underneath a lateral edge of a pair of lateral edges along the roof opening in a longitudinal direction, said stationary guide configured to guide the at least one movable element,
    a drive motor for driving the at least one movable element,
    a drive cable member at least partly guided in the stationary guide and connected between the drive motor and the at least one movable element,
    the drive cable member being guided in a channel in the stationary guide, and capable of pushing or pulling the at least one movable element in the stationary guide in a longitudinal direction,
    the drive cable member further comprising, connected at one end, a drive cable plate, said drive cable plate being connected with the at least one movable element and being slidably engaged with at least one wall of the stationary guide,
    wherein the drive cable plate further comprises at least one separate slide shoe device slidably engaging the at least one wall of the stationary guide, said slide shoe device being capable of biasing the drive cable plate with respect to the at least one wall of the stationary guide, and
    wherein the drive cable plate comprises a main body and wherein the slide shoe device is movably guided in a recess in the main body and is formed as a receptacle having an inner space and being made of a first material, said slide shoe device further comprising a buffer element fitted into the inner space of the receptacle, said buffer element being made of a second material and having biasing properties towards the at least one wall of the stationary guide.

2. The open roof construction according to claim 1 wherein the first material comprises POM.

3. The open roof construction according to claim 1 wherein the slide shoe device is provided with a ribbed surface engaging the at least one wall of the stationary guide.

4. The open roof construction according to claim 3 wherein the ribbed surface comprises ribs for removing dust, the ribs having an angle with respect to the longitudinal direction in a range of about 30 to about 60 degrees.

5. The open roof construction according to claim 1 wherein the second material comprises EPDM rubber.

6. The open roof construction according to claim 5 wherein the EPDM has a shore hardness in the range of about Shore A 40 to about Shore A 80.

7. The open roof construction according to claim 6 wherein the EPDM rubber has a shore hardness of about Shore A 60.

8. The open roof construction according to claim 1 wherein the receptacle is provided with an inner bottom surface and the main body comprises a protrusion part, and wherein the buffer element is biased between the inner bottom surface of the receptacle and the protrusion part of the main body so as to prevent any gap between the drive cable plate including the slide shoe device and the at least one wall in the stationary guide.

9. The open roof construction according to claim 1 wherein the slide shoe device is movably connected to an upper surface of the drive cable plate and engages the at least one wall of the stationary guide.

10. The open roof construction according to claim 1 wherein the slide shoe device is movably connected to a lower surface of the drive cable plate engaging the at least one wall of the stationary guide.

11. The open roof construction according to claim 5 wherein the EPDM material is overmolded into the receptacle of the slide shoe device.

12. The open roof construction according to claim 1 wherein the at least one movable element is a movable panel or a movable screen and wherein the drive cable plate is connected to the movable panel or the movable screen.

13. The open roof construction according to claim 4 wherein the ribs have an angle with respect to the direction of the longitudinal guide of about 45 degrees.

14. A vehicle comprising an open roof construction for use therein, the vehicle comprising:
    a fixed roof having a roof opening,
    a stationary guide extending in a longitudinal direction underneath each lateral edge of a pair of lateral edges on opposite sides of the roof opening,
    at least one movable element, each stationary guide configured to guide the at least one movable element,
    a drive motor for driving the at least one movable elements,
    a drive cable member at least partly guided in each stationary guide and connected between the drive motor and the at least one movable element,
    the drive cable member being guided in a channel in each stationary guide, and capable of pushing or pulling the at least one movable element in the stationary guides in the longitudinal direction,
    each drive cable member further comprising, connected at one end, a drive cable plate, said drive cable plate being connected with the at least one movable element and being slidably engaged with at least one wall of the stationary guide,
    wherein each drive cable plate further comprises a separate slide shoe device slidably engaging the at least one wall of the stationary guide, said slide shoe device being capable of biasing the drive cable plate with respect to the at least one wall of the stationary guide, wherein each drive cable plate comprises a main body and wherein the slide shoe device is movably guided in a recess in the main body and is formed as a receptacle having an inner space and being made of a first material, said slide shoe device further comprising a buffer element fitted into the inner space of the receptacle, said buffer element being made of a second material and having biasing properties towards the at least one wall of the stationary guide.

15. The vehicle according to claim 14 wherein the receptacle is provided with an inner bottom surface and the main body comprises a protrusion part, and wherein the buffer element is biased between the inner bottom surface of the receptacle and the protrusion part of the main body so as to prevent any gap between the drive cable plate including the slide shoe device and the at least one wall in the stationary guide.

16. The vehicle according to claim 15 wherein the slide shoe device is provided with a ribbed surface engaging the at least one wall of the stationary guide.

17. The vehicle according to claim 16 wherein the ribbed surface comprises ribs for removing dust, the ribs having an angle with respect to the longitudinal direction in a range of about 30 to about 60 degrees.

18. The vehicle according to claim 17 wherein the ribs have an angle with respect to the direction of the longitudinal guide of about 45 degrees.

19. The vehicle according to claim 15 wherein the at least one movable element is a movable panel or a movable screen and wherein the drive cable plate is connected to the movable panel or the movable screen.

20. The vehicle according to claim 19 wherein the first material comprises POM and the second material comprises EPDM rubber.

* * * * *